Oct. 19, 1965  R. H. JOHNSTON  3,212,448

FLUID APPARATUS

Filed April 22, 1963

INVENTOR.
ROY H. JOHNSTON

BY

ATTORNEY

United States Patent Office 3,212,448
Patented Oct. 19, 1965

3,212,448
FLUID APPARATUS
Roy H. Johnston, Chagrin Falls, Ohio, assignor to Clevite Corporation, a corporation of Ohio
Filed Apr. 22, 1963, Ser. No. 274,638
4 Claims. (Cl. 103—173)

This invention relates generally to an improved fluid apparatus and, more particularly, to a barrel engine or pump of the swashplate type which is uniquely adapted for delivery of corrosive or chemically reactive fluids.

While the device of this invention is described herein as a pump, this description is not to be interpreted in a restricted sense as the invention can be applied with equal facility to an engine.

The chemical incompatibility of fluids in a pump with the load carrying mechanical parts of the pump or lubricants therefor poses a considerable problem to the industry. For example, the penetration of lubricant oil particles into conduits in which fluids of hydrogen peroxide are carried causes a contamination of the hydrogen peroxide and a consequent decomposition (under certain conditions which occur frequently) which destroys the usefulness of the hydrogen peroxide. Vice versa, a leakage of hydrogen peroxide vapors into a crankcase filled with lubricant will ignite the lubricants and cause severe damage to the fluid carrying apparatus.

One solution has been to construct a pump with parts formed of materials selected on the basis of chemical compatibility with the fluids, however, this approach is quite frequently inadequate since more often than not the materials so selected either do not meet the engineering requirements, or if they do are prohibitively expensive.

It is the primary object of the present invention to provide a simple and inexpensive means for overcoming these difficulties by providing a separation between the corrosive or chemically reactive fluids on the one hand and the load carrying mechanical parts and the lubricant therefor on the other.

It is a further and more specific object of this invention to protect the bearing surface of the pistons used in this apparatus, in such a manner that one end of the piston will come in contact only with a lubricated section of the pump and the opposite end of the piston is only exposed to the corrosive fluid. This simplifies the selection of compatible materials by increasing the number of materials that can be used for any given situation.

Another object of this invention, in line with the object stated in the preceding paragraph, is to separate the corrosive fluids or chemical reactive fluids carried by the pump, from the load carrying mechanical parts of the pump and more particularly the lubricant therefor, to effect a simplification of design criteria also for other components such as O-rings or seals. For example, if hydrogen peroxide is pumped by this apparatus, the seal members used therein must be chemically compatible with the chemical composition of hydrogen peroxide as well as with the lubricant materials. It is well known, that such requirements are difficult to meet and in all cases increases the cost for such an item.

For a better understanding of the present invention, together with other and further objects thereof, reference is had to the following description taken in connection with the accompanying drawings, and its scope will be pointed out in the appended claims.

Figure 1:
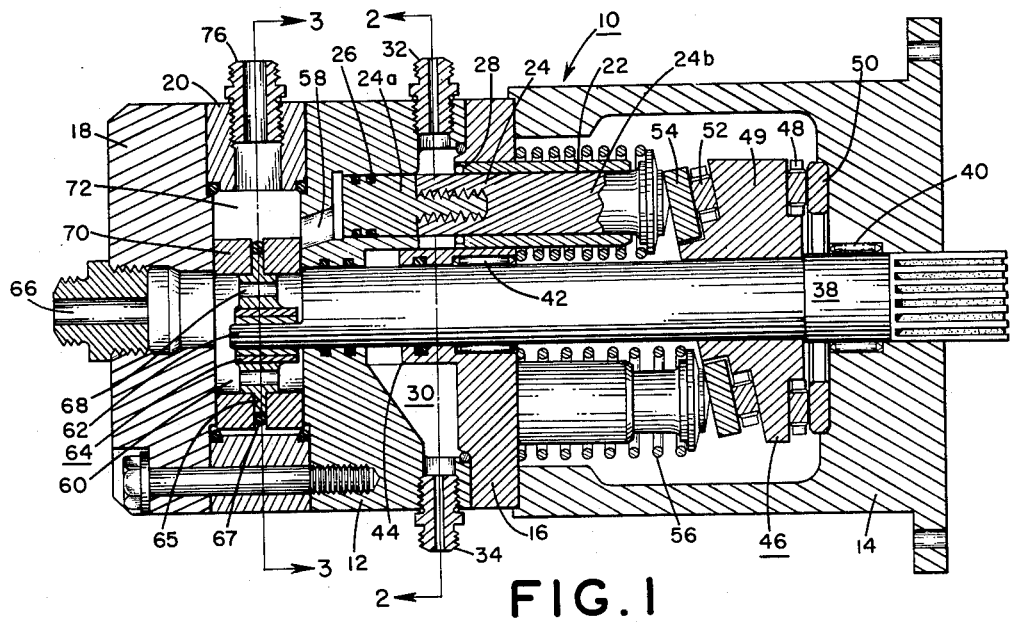
FIGURE 1 is a longitudinal cross section of a swashplate engine constructed in accordance with this invention taken along line 1—1 of FIGURE 2.

An aspect of the present invention resides in the provision of a fluid apparatus in which a housing includes a plurality of cylinder bores which extend parallel to and are arranged in circular array about the central axis of the housing. The housing has a cavity which defines a purge chamber arranged transverse with respect to the central axis of the housing and which is located axially between the ends of the cylinder bore. An elongated piston member is slidably disposed in each cylinder bore for reciprocation therein and through the purge chamber. A shaft is coaxially mounted in and with respect to the housing and a cam means, such as a swashplate, is mounted on the shaft and constructed and arranged for effecting reciprocation of the pistons. A fluid intake and exit conduit is provided in the housing for connecting each of the cylinder bores to a fluid source such as hydrogen peroxide. A valve is mounted to the shaft and is rotatable in unison therewith to sequentially open and close fluid flow communication between the conduits and the cylinder. The aforementioned purge chamber of the housing is effective to maintain a separation between fluids of the lubricants and the corrosive fluids passing through the conduit.

Referring now to the drawing there is shown a multi-structure housing 10 which is comprised of a cylinder block 12 and a coaxially extending crankcase 14 spaced relative to the block 12 by means of a spider member 16 interposed therebetween. At the other end of the housing, a pump head 18 is indirectly connected to the cylinder block 12 with a hollow, annular, spacer member 20 secured between the head and the block and forming a valve chamber in its center.

Formed integral with the cylinder block 12 and the spider member 16 are a plurality of cylinder bores which extend parallel to and are arranged in circular array about the central axis of the housing. Mounted on the spider member and contiguous with each bore is a tubular sleeve 22 extending axially from the spider member into the crankcase. The spider member 16 is entirely unperforated except for the plurality of circular openings occupied by the sleeve member 22 and shaft 38.

An elongated piston 24 is slidably carried in each cylinder bore of the cylinder block 12 and in tubular sleeve 22. Frictional contact of each piston with the cylinder block is minimized, or completely avoided, by the provision of two annular seal members 26, carried on the piston in a peripheral groove of rectangular cross section provided therefor.

The pistons 24 are guided and supported against transverse movement entirely by the tubular sleeves 22 depending from the spider member 16, the upper portions of the pistons which occupy bores formed in the cylinder block 12 being relieved of any duty other than displacement of fluid carried therein. Thus, the pistons 24 can be fitted in the cylinder block bores with adequate clearance to prevent frictional contact, the clearance being limited only to an amount capable of providing adequate support for the sealing members 26 carried on the pistons. The elimination of the need for frictional compatibility between pistons and cylinder bores in the region where corrosive fluids are also present provides a greater freedom in the selection of suitable materials.

In the preferred embodiment of this invention, a composite piston structure is used to enhance the compatibility of the piston relative to the fluid to be delivered by the pump. For ease of reference, I will designate the portion of the piston reciprocating in the cylinder block numeral 24a and the remainder of the piston numeral 24b. These two piston portions, 24a and 24b, constitute two individually constructed components which are secured together by threaded engagement (not shown). Complete isolation of the sleeve enclosed portion 24b from corrosive liquids permits the use of hardened steel piston walls, while portion 24a, which is in contact with corrosive fluid but does not frictionally engage the cylinder walls, is constructed of stainless walls, a material exhibiting the characteristics of high chemical compatibility but a low friction quality.

Sleeves 22 preferably are of hardened steel. With adequate lubrication from the crankcase fully hardened pistons will usually work satisfactorily in the hardened steel sleeves but in cases where the delivery pressure is not extremely high the pistons may be fabricated to include a graphitic sleeve for frictional engagement with the sleeves 22. In applications involving extremely severe conditions, the external surface of hardened pistons can be coated with an electro-deposit of suitable bearing material.

To provide an effective fluid separation between the corrosive fluids and the lubricants in the crankcase, an annular seal 28 is interposed between the sleeve 22 and piston 24. However, the provision of the annular seal 28 is inadequate to accomplish, singularly, a sufficient and adequate separation. Therefore, the cylinder block 12 in conjunction with the spider member 16 is formed with a purge chamber 30 which extends radially from the central axis of the housing 10 approximately to the circumference thereof, and which is located axially between the cylinder bores of the block 12 and the spider member 16.

The most important aspect is, of course, that portions of the pistons reciprocate in and through the chamber 30.

Figure 2:
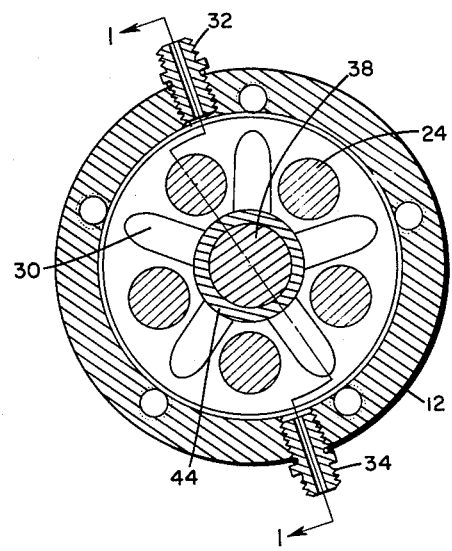
FIGURE 2 is a cross sectional view of the device shown in FIGURE 1 taken along line 2—2 of FIGURE 1.

The purge chamber 30 functions in two ways. In one of the embodiments, the cylinder block has an inlet 32 and an outlet 34 connected to the purge chamber 30, as shown in FIGURES 1 and 2. Cleansing fluid, such as water, may thus be circulated through the chamber for removal of any corrosive fluid leaking around the piston rings 26, and to prevent admission of the fluid into the crankcase by way of sealing member 28 in sleeve 22. Similarly, the circulating water will prevent lubricants from entering into areas of the head 18, the spacer member 20 and the cylinder bores of the block 12. Alternatively, depending upon the corrosive fluids involved, no liquid is circulated through the chamber. Instead, the fluid inlet and outlet members, 32 and 34, respectively, are just opened to permit the escape of dangerous gases and to enable a drain by gravity flow of any liquid particles that may enter the purge chamber.

The other components of this device are of a more conventional nature. A shaft 38 is rotatably supported within the housing 10 by means of a pair of needle bearings 40 and 42, one being carried within the crankcase, and the other being spaced from the first and carried within a special sleeve extension 44 of spider member 16 provided for this purpose. The sleeve 44 is also suitably sealed against the shaft.

A swashplate cam assembly 46 is secured to the shaft 38 by means of a key, not shown, and rotates with it. The incline shape of the cam translates the reciprocating linear motion of the pistons 24 into rotary motion.

The swashplate cam assembly 46 includes a roller bearing 48 carried by a cam 49 and engaging thrust ring 50 which is partly embedded in the crankcase housing 14. At the opposite end, the cam 49 carries upon it another roller bearing 52 which in turn engages a thrust washer 54 for engagement with the pistons 24. The pistons 24 are suitably biased against the cam assembly 46 by means of a coil spring 56 surrounding each piston and one axial end thereof engages the spider member while the opposite end reacts against the piston.

Figure 3:
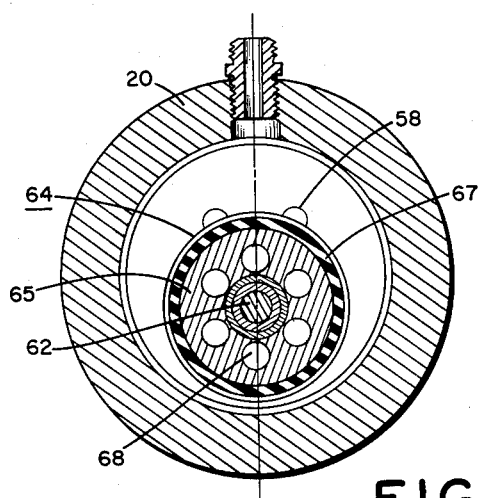
FIGURE 3 is a view similar to FIGURE 2 taken along line 3—3 of FIGURE 1.

A port 58 connects each cylinder bore to the cavity 60 of the annular spacer member 20. The shaft 38 extends into the cavity and an eccentric pin extension 62 carries an orbital valve 64 which rotates in unison with the shaft. The valve 64 includes a spider member 65 coaxially carrying a pair of annular rings 70 as shown in FIGURE 1. A rectangular rubber ring 67 disposed between the rings 70 provides a biasing force holding one of the rings in sliding contact with the head 18 and the other in sliding contact with the adjacent face of the cylinder block 12. Rotation of the shaft is effective to sequentially open and close fluid communication between fluid inlet 66, through axially extending openings 68 in the valve, and the ports 58 of the cylinder block. Thus ports 58 are alternately opened, by rotation of the valve, to the cavity enclosed by annular rings 70 and to the discharge space located radially with respect to the rings 70, see FIGURE 3, and ultimately through outlet 76. The pin 62 on the end of the shaft 38 is positioned with respect to cam 49 to open the cylinder ports to the intake cavity 60 while the pistons are descending and to the discharge space 72 while they are making the return stroke.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A fluid apparatus comprising, in combination: a housing including a stationary cylinder block having a plurality of cylinder bores extending parallel to and being arranged in circular array about the central axis of said block and said block having an axially projecting peripheral rim portion, a spider member connected to said rim portion of said block defining a purge chamber therebetween, and a crankcase filled with lubricants connecting to said spider member; an elongated piston member slidably disposed in each cylinder bore and extending through said spider member and into said crankcase, said pistons reciprocating in and through said purge chamber a shaft coaxially mounted in and with respect to said housing; cam means on said shaft arranged for effecting reciprocation of said pistons; a fluid intake and exit conduit in said cylinder block for connecting each of said cylinder bores to a source of fluid; a valve mounted to said shaft and rotatable in unison therewith to sequentially open and close fluid flow communication between said conduits and said cylinders, the purge chamber of said housing being effective to maintain a separation between fluids of the lubricants and the fluids passing through said conduits; and means for disposing of fluids escaping from said conduits and said crankcase into said purge chamber.

2. A fluid apparatus according to claim 1, wherein said housing, and more particularly said purge chamber, is connected to a source of cleansing fluid to provide a fluid barrier in said purge chamber.

3. A fluid apparatus comprising, in combination: a housing including a stationary cylinder block having a plurality of cylinder bores extending parallel to and being arranged in circular array about the central axis of said block, said block having an axially projecting peripheral rim portion, and a spider member having cylinder bores arranged complementary to aforesaid bores and said spider member being connected to said rim portion of said block and defining a totally enclosed purge chamber therebetween transverse with respect to said central axis and located axially between the cylinder bores of the spider member and the cylinder bores of the cylinder block, and a crankcase connected to said spider member; an elongated piston member slidably disposed in substantially non-frictional contact in each cylinder bore for reciprocation therein and through said purge chamber and for reciprocating in frictional contact through said spider member and into said crankcase; a shaft coaxially mounted in and with respect to said housing; cam means on said shaft and arranged for effecting reciprocation of said pistons; fluid intake and exit conduits in said cylinder block for connecting each of said cylinder bores thereof to a source of fluid; a valve mounted to said shaft and rotatable in unison therewith to sequentially open and close fluid flow communication between said conduits and said cylinders.

4. A fluid apparatus according to claim 3 characterized in that the portion of the piston member in substantially non-frictional contact with the bore of the cylinder block is comprised of relatively high friction materials and the portion in frictional contact with said spider member is comprised of comparatively low friction materials.

References Cited by the Examiner

UNITED STATES PATENTS

| | | | |
|---|---|---|---|
| 2,238,252 | 4/41 | Davis | 103—173 |
| 2,591,902 | 4/52 | Yohpe | 103—204 |
| 2,604,046 | 7/52 | Stoyke | 103—173 X |

LAURENCE V. EFNER, *Primary Examiner.*